3,337,603
CONTINUOUS PROCESS OF PREPARING FORMYL CARBOXYLATES AND CYANO ALDEHYDES BY THE OXO REACTION
Jiro Kato and Ryoji Iwanaga, Tokyo, Takeshi Hayama, Yokohama, Takashi Komatsu, Tokyo, and Takashi Fujii, Kawasaki, Japan, assignors to Ajinomoto Co., Inc., Tokyo, Japan
Filed Jan. 27, 1964, Ser. No. 340,137
Claims priority, application Japan, Dec. 31, 1958, 34/283
11 Claims. (Cl. 260—465.1)

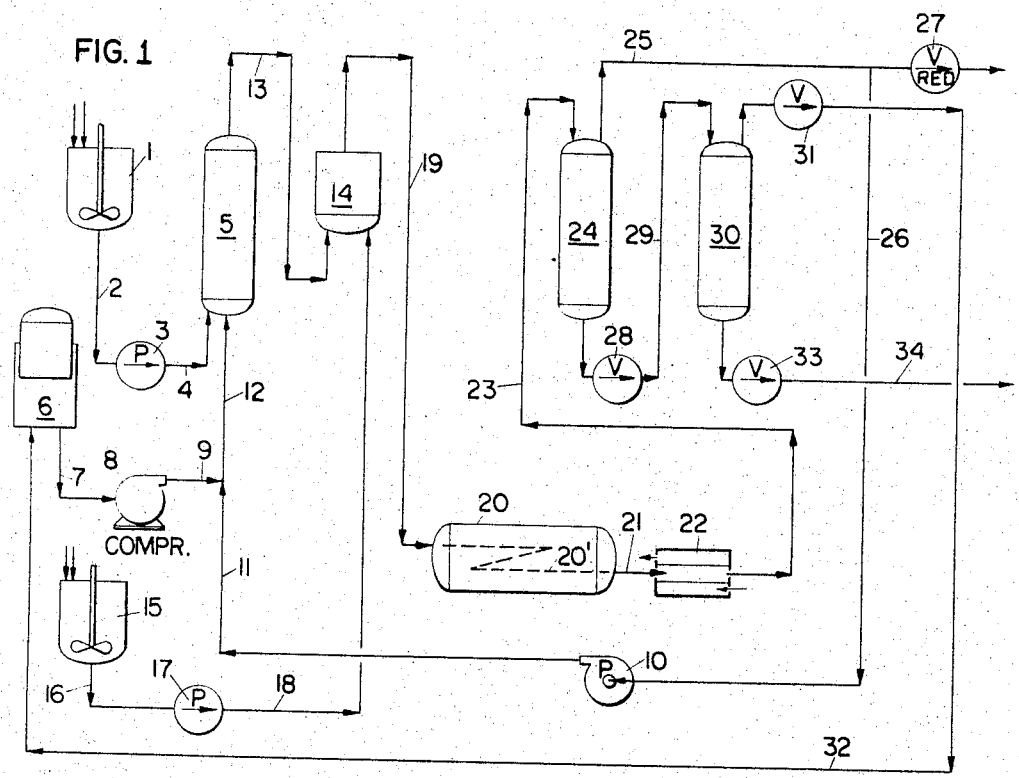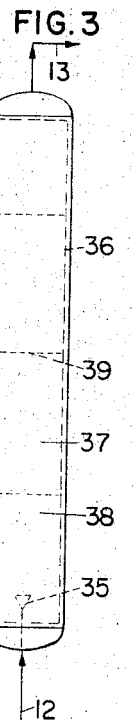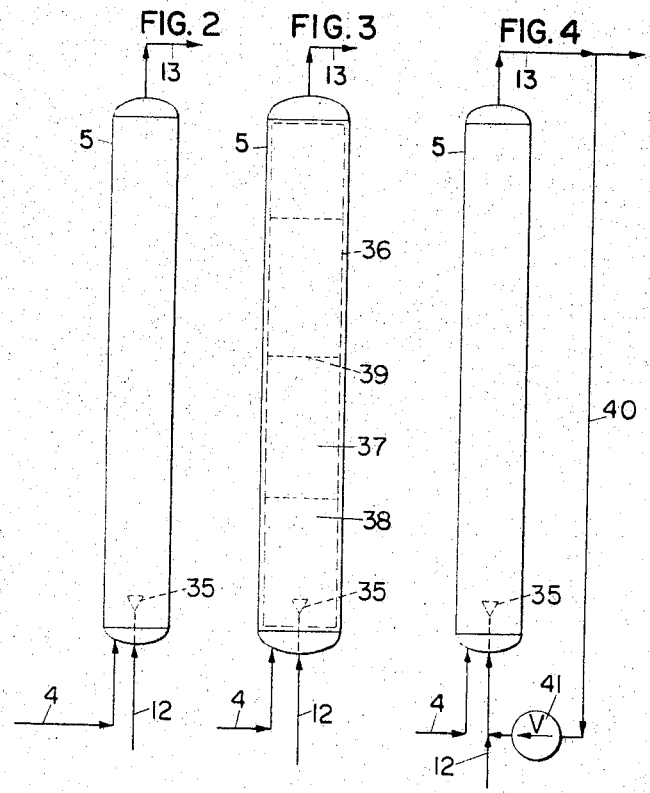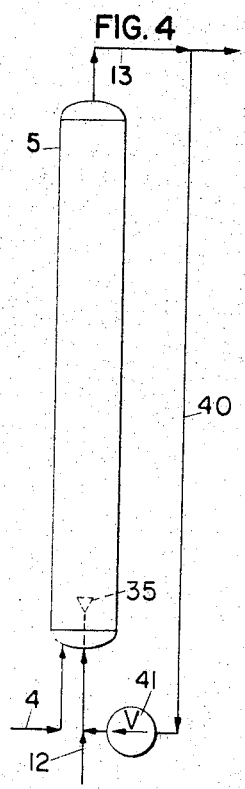
FIG. 1
FIG. 2
FIG. 3
FIG. 4
INVENTORS
JIRO KATO
RYOJI IWANAGA
TAKESHI HAYAMA
TAKASHI KOMATSU
TAKASHI FUJII
BY
AGENT

This application is a continuation-in-part of our co-pending application Ser. No. 855,125, filed Nov. 24, 1959, and now abandoned.

This invention relates to a continuous process of preparing aldehydes by the so-called "oxo reaction," and more particularly to the formation of a catalyst and the pretreatment of starting materials for the oxo reaction.

In the oxo reaction, aldehydes are synthesized from an organic compound having an olefinic double bond, carbon monoxide, and hydrogen in the presence of a cobalt catalyst, particularly cobalt carbonyl. The reaction takes place at elevated temperature and pressure. The reaction is strongly exothermic. 30 calories may be typically developed per mole of olefinic compound.

It is necessary to remove the heat of reaction in order to control the reaction, to maintain the yield and purity of the aldehyde formed, and to avoid decomposition of such heat-sensitive olefinic starting materials as acrylonitrile and acrylates. The most favorable temperature for producing aldehydes from the aforementioned heat-sensitive olefinic compounds, therefore, is relatively low, between 110° and 140° C., and the optimum range is between 125° and 135° C.

The reaction temperature may be controlled by admixing a portion of the reaction product to the starting materials, by diluting the reaction mixture with inert solvents in order to reduce the concentration of the olefinic compound, or by reducing the catalyst concentration. It is also possible to use only a small portion of the necessary catalyst in the initial stages of the reaction, and to add the bulk of the catalyst when the reactants are partly spent. Internal and external cooling of the reaction vessel may also be resorted to.

Continuous oxo reactions are preferably carried out in long and narrow tubular vessels having a diameter-to-length ratio of approximately 1:100 or more, preferably 1:1,000 more, which are capable of being cooled externally in an efficient manner, are simple to construct and convenient to operate. The primary object of this invention is a method of carrying out an oxo reaction in a long tubular reaction vessel of the type described while avoiding certain serious inherent shortcomings of such reaction vessels that will become presently apparent.

It is known continuously to supply the olefinic compound, carbon monoxide, hydrogen and the cobalt catalyst to the reaction vessel, and a reaction mixture containing the desired aldehyde is drawn off continuously together with any excess of the starting materials. The cobalt catalyst may be cobalt carbonyl but cobalt metal and many cobalt compounds are converted to cobalt carbonyl compounds, such as dicobalt octacarbonyl and cobalt hydrocarbonyl, by carbon monoxide at high temperature and pressure in the reaction zone, and may also be employed. Suitable catalyst materials thus include finely divided cobalt metal as obtained by reduction of its oxides, cobalt oxide, cobalt hydroxide, salts of cobalt with inorganic and organic acids, and complex organic cobalt compounds.

We have found that metallic cobalt and the aforementioned compounds are not converted to cobalt carbonyl at temperatures lower than 150° C. unless at least a small amount of cobalt carbonyl is initially present. If cobalt carbonyl is present, cobalt metal and its compounds are readily converted to the carbonyl at temperatures as low as 100° C. The active catalyst form in the oxo reaction is the cobalt carbonyl, and the oxo reaction, therefore, is not catalyzed by cobalt compounds other than the carbonyl unless the reaction zone has a temperature of at least 150° C. In the presence of an initial amount of cobalt carbonyl, the oxo reaction is initiated and proceeds smoothly at much lower temperatures.

The importance of the initial presence of cobalt carbonyl is evident from the following example.

*Example 1*

A dispersion of cobalt hydroxide in methanol containing 2.4 grams cobalt per liter was fed to a reaction vessel at a rate of two liters per hour. Simultaneously, a mixture of one part carbon monoxide and two parts hydrogen was fed to the vessel at the rate of 1.8 cubic meters per hour (as measured at ambient temperature and pressure).

The reaction vessel was a cylindrical tube one meter high and having an internal diameter of 35 millimeters. A pressure of 200 atmospheres was maintained. The catalyst dispersion and the gas mixture were introduced from the bottom, and a reaction mixture was withdrawn from the top and analyzed for the presence of cobalt carbonyl.

The reaction vessel was jacketed, and the temperature in its interior was maintained by the heating jacket at 100°, 130°, 140°, 150°, and 160° C. in successive runs. Cobalt carbonyl was formed only in the two runs at 150° and 160°.

In a second series of experimental runs, 0.3 liter of a cobalt carbonyl solution in methanol containing 2.4 grams cobalt per liter were introduced into the reaction vessel at the start of the run. Cobalt hydroxide and a mixture of carbon monoxide and hydrogen were fed to the reaction vessel containing a small initial amount of cobalt carbonyl in the manner indicated above in successive runs in which the temperature of the vessel was kept at 90° C., 100°, 110°, and 120° C. No additional cobalt carbonyl was found in the reaction mixture discharged from the vessel at 90°, but cobalt carbonyl was formed by reaction of the cobalt hydroxide with carbon monoxide at 100° and at higher temperatures.

Since the formation of the carbonyl from other cobalt bearing materials and carbon monoxide is catalyzed by the carbonyl, the reaction can be greatly accelerated if it is performed continuously under conditions which favor thorough mixing of the starting materials with the reaction products. Cobalt carbonyl is continuously formed at a higher rate in a reaction vessel whose cross section is a much larger fraction of its length in the direction of material flow than the cross section of the preferred tubular vessel employed in the oxo reaction. Carbonyl formation is also favored by feeding the gaseous raw material, namely carbon monoxide and hydrogen, to the reaction vessel in such a manner as to agitate the liquid contents thereof, and to mix the partly reacted contents of the vessel with the entering reactants. Cobalt carbonyl is formed under such conditions at temperatures much below 150° C.

As has been pointed out above, a very narrow tubular reaction vessel has important advantages in the oxo reaction. Mixing of fresh reactants with reaction products, hereinafter referred to as "back-mixing," is virtually impossible in such a reaction vessel. The flow path of the fluid reaction mixture is straight and there is no significant amount of back-mixing. If an oxo reaction is to be performed in such a vessel at a temperature of 140° C. or less to avoid decomposition of heat-sensitive reactants or reaction products, cobalt carbonyl must be continuously supplied.

Cobalt carbonyl is decomposed by oxidants, such as elementary oxygen. The water gas and synthesis gas which are used as sources of carbon monoxide and hydrogen when the oxo reaction is performed on an industrial scale contain oxygen. If the oxygen admitted to the reaction zone is sufficient to destroy the simultaneously admitted carbonyl, an oxo reaction cannot be performed at temperatures substantially below 150° C.

The permissible concentration of oxygen in the gaseous reactants depends on the rate at which cobalt carbonyl is supplied, on the rate at which the gaseous reactants are fed to the reaction zone, the temperature of that zone and, most importantly, on the rate at which additional cobalt carbonyl is formed in that zone. As has been shown above, the rate of carbonyl formation from other cobalt compounds is greatly influenced by the shape of the container and the resulting back-mixing. In a vessel in which the reactants are thoroughly mixed with partially reacted material, an oxygen concentration as high as 0.1 to 0.5 percent by volume may be tolerated according to our findings, in the preferred long and narrow tubular reaction vessel, the maximum concentration of oxygen in the gaseous reactants must be very low and should preferably be below 0.02 percent, as is apparent from the following example.

*Example 2*

The reaction vessel employed was a tube having an internal diameter of 6 millimeters and a length of 120 meters. The tube was bent into 20 turns, each six meters long and was enclosed in an enveloping casing. Superheated water at 130° C. was circulated between the tube and the casing.

The reaction vessel was continuously supplied with a methanol solution containing 160 grams acrylonitrile per liter and cobalt carbonyl equivalent to 1.2 grams cobalt per liter at a rate of four liters per hour. The vessel also was fed a 1:2 mixture of carbon monoxide and hydrogen contaminated with oxygen at a rate of 1.8 cubic meters per hour (as measured at ambient temperature and pressure). The reaction vessel was held at a pressure of 200 atmospheres which was measured at the feed end.

The oxygen contamination of the gas mixture was varied in the several runs made under the otherwise uniform conditions indicated above, and the rate of conversion of the arcylonitrile to β-cyanopropionaldehyde was determined by analysis of the product withdrawn continuously from the top of the reaction vessel. The following correlation between oxygen content of the raw gas mixture in percent by volume and the conversion rate of the acrylonitrile was found:

| Oxygen, percent by volume | 0.5 | 0.1 | 0.05 | 0.03 | 0.02 | 0.01 | 0.001 |
|---|---|---|---|---|---|---|---|
| Conversion rate, percent | 0 | 0 | trace | 70 | 82 | 84 | 86 |

Successful use of an elongated tubular reaction vessel for the oxo reaction at temperatures substantially below 150° C. thus requires a continuous supply of cobalt carbonyl and the use of reactant gases purified of all but a faint trace of oxygen.

The necessary cobalt carbonyl must be prepared separately from cobalt metal or other cobalt bearing materials in a continuous reaction with water gas or synthesis gas. This reaction also should be carried out at the lowest possible temperature. A small amount of water is formed as a by-product of the carbonyl reaction and combines with cobalt carbonyl to form cobalt hydrocarbonyl, an acidic material which is very corrosive, particularly in the presence of polar solvents. The rate of corrosion of the reaction vessel by cobalt hydrocarbonyl increases rapidly with increasing temperature.

Polar oxygen-containing solvents are preferred for the oxo reaction for reasons disclosed in detail in U.S. Patent No. 2,978,481. It is advantageous to form the cobalt carbonyl in the same liquid medium in which the oxo reaction takes place. At high temperatures, the preferred solvents react with carbon monoxide in the presence of the cobalt catalyst to form carbonylated products that interfere with the oxo reaction and adversely affect the ultimate yield of the desired aldehyde.

The disadvantages of high temperature in the conversion of cobalt bearing material, including cobalt metal, to cobalt carbonyl can be avoided if that reaction is performed under conditions which favor intensive back-mixing of the fresh reactants with the reaction product in the manner described above. Such back-mixing permits operation at temperatures between 100° and 140° C. in the formation of cobalt carbonyl, and the use of a raw reactant gas containing an appreciable amount of oxygen which is removed during cobalt carbonyl formation and cannot interfere with the oxo reaction proper.

In the method of our invention, a cobalt bearing material is dissolved or dispersed in an organic solvent. The resulting mixture, carbon monoxide and hydrogen are fed to a first reaction zone, and are reacted with each other at elevated temperature and pressure with vigorous agitation. Conversion of the cobalt bearing material to cobalt carbonyl proceeds rapidly because of the autocatalytic effect of the reaction product which is mixed with the starting materials. Oxygen present in the raw gas is consumed in a reaction in which oxygen combines with hydrogen to form water in the presence of a large amount of cobalt carbonyl.

A solution of the cobalt carbonyl in the solvent is withdrawn from the first reaction zone and fed to a second zone together with an olefinic compound and with carbon monoxide and hydrogen. An elongated very narrow tubular vessel may be employed for the second phase of the reaction without any of the disadvantages attendant to the use of such vessels in conventional processes. The temperature in the second reaction zone may be kept well below 150° C. if the olefinic compounds employed are temperature sensitive.

The preferred cobalt bearing materials which are converted to cobalt carbonyl in the first reaction zone of our method include the metal in finely divided form, as it is obtained by reduction of the oxide, the oxide itself, the hydroxide, and salts of organic acids including the carbonate, formate, acetate, stearate, oleate, palmitate, naphthenate, and salts of acids having a relatively high molecular weight, and organic complex compounds of cobalt.

The oxide, hydroxide and carbonate are preferred because the reaction products formed with the reactants, other than cobalt carbonyls, are water and carbon dioxide, and do not contaminate the reaction medium of the subsequent oxo reaction. Cobalt hydroxide has the added advantage of being recovered as such from the reaction mixture formed in the oxo reaction. Cobalt hydroxide is readily dispersed in organic solvents to form stable suspensions which do not leave deposits on interior surfaces of pumps, pipes or valves of the high pressure apparatus. Cobalt hydroxide also is not abrasive and does not cause wear of the equipment.

The solvents in which the cobalt compound is dispersed prior to conversion to the carbonyl should be stable and inert to the reactants under the conditions of conversion. This requirement is met by benzene, toluene, hexane and other hydrocarbons, cyclohexanone, methanol, ethanol, propanol, the several butanols, acetone, many esters and ethers. The same solvent is preferably employed in the conversion of the cobalt compound to the carbonyl that is employed in the oxo reaction medium. The polar solvents described in the afore-mentioned patent are preferred in most instances.

The reaction vessel in which the cobalt compound is converted to the carbonyl should be of a type which favors back-mixing, that is mixing of the reaction products with the starting materials, whereby the rate of carbonyl formation is increased, and elementary oxygen is removed from the gaseous raw materials. A vessel the length-to-width ratio of which is substantially smaller than that of the vessel employed in the oxo reaction proper causes back mixing of its contents. It is heated either by an external jacket or by an internal heating coil.

When a run is started, a small amount of cobalt carbonyl solution is placed in the bottom of the first reaction vessel, and the solution of cobalt bearing material, the carbon monoxide, and the hydrogen are fed to the bottom of the vessel. These reactants are supplied in such proportions and at such a rate as will be needed in the oxo reaction performed in a second vessel of different length to width ratio.

Normally, the cobalt bearing material including an organic solvent and the raw mixture of carbon monoxide and hydrogen are admitted to the first reaction vessel through separate inlets. The generally liquid material and the gaseous mixture are heated to the temperature prevailing in the first reaction zone before being pumped through the inlets at a pressure sufficient to overcome the internal pressure of the reaction vessel. A mixture of solvent, cobalt carbonyl, carbon monoxide, and hydrogen free from oxygen is withdrawn through a common outlet at the top of the first reaction vessel.

The pressure in the first reaction zone is held between 50 and 300 atmospheres, and the temperature between 100° and 140° C., preferably between 105° and 120° C.

The mixture of solvent, cobalt carbonyl and oxygen-free gases is further combined with a solution of the olefinic compound and fed to a very long tubular second reaction vessel in which the oxo reaction is performed at 110° to 140° C., preferably between 125° C. and 135° C., and at a pressure of 50 to 300 atmospheres. The oxo reaction proceeds smoothly in the presence of cobalt carbonyl and in the absence of oxygen. The reaction temperature is controlled in a conventional manner. The yield of aldehyde is high even from olefinic compounds sensitive to higher temperatures.

The heat exchange medium employed for removing the heat of reaction from the second reaction zone by external or internal cooling may be pressurized water, a high boiling oil, or one of the known proprietary high-boiling organic liquids commonly used for this purpose. The tubular second reaction vessel may be coiled or otherwise shaped so that its great length may be accommodated in a relatively small space. Heat transmission is improved and the control of the reaction temperature is facilitated by making the ratio of length-to-diameter of the second reaction vessel as great as possible.

Temperature control is more difficult near the feed end of the reaction vessel than near the discharge end and the feed end may, therefore, be made even narrower than the remainder of the vessel.

The dwell time of the reaction mixture in the second reaction zone should be between about ten and forty minutes, and the dimensions of the reaction vessel are selected accordingly.

The reaction mixture discharged from the second reaction zone is cooled, and the liquids present are separated from the gases. A cobalt bearing material and solvent are removed from the aldehyde in the liquid phase, and the crude aldehyde is purified. The recovered cobalt bearing material is returned to the first reaction zone for conversion to cobalt carbonyl. Known catalyst recovery processes yield cobalt hydroxide in a simple and efficient manner.

The method of the invention thus provides the advantages of the known very long tubular reaction vessel for the oxo reaction while permitting continuous operation at relatively low temperatures with a raw mixture of carbon monoxide and hydrogen which is relatively heavily contaminated with oxygen.

Apparatus suitable for carrying out the method of the invention is diagrammatically illustrated in the attached drawing in which:

FIG. 1 shows the overall arrangement of the equipment; and

FIGS. 2 to 4 illustrate three different types of first reaction vessels which favor back mixing.

Referring initially to FIG. 1, there is seen a mixing tank 1 in which a cobalt bearing material other than cobalt carbonyl is dispersed in a solvent. The suspension or solution formed flows through a conduit 2 to a pump 3 and is fed by the pump under pressure through a conduit 4 to the bottom of a reaction vessel 5 which encloses the first reaction zone.

Water gas or synthesis gas is drawn from a gas holder 6 through a line 7 by a compressor 8. The pressure of the gaseous mixture is raised to 50 to 300 atmospheres by the compressor, and is discharged through a line 9 into a high pressure pipe 12 which connects a circulating pump 10 with the bottom of the first reaction vessel 5 whose length is less than thirty times its diameter.

The reaction vessel is kept at a temperature of 100° to 140° C. in a manner not further illustrated. A solution of cobalt carbonyl in the original solvent and a mixture of carbon monoxide and hydrogen stripped of oxygen is released from the top of the reaction vessel 5 into a line 13 which leads to a high pressure mixing tube 14.

An olefinic compound and another portion of the solvent employed for dispersing the cobalt bearing material are mixed in a tank 15, and the solution obtained is fed to the tube 14 through a conduit 16, a pump 17, and another conduit 18.

The gaseous reactants and the solvent solutions of the olefinic compound and of cobalt carbonyl are intimately mixed in the tube 14, and are conveyed through a conduit 19 to a reaction vessel 20' which is a narrow long tube coiled in an outer envelope 20. The space between the tube 20' and the outer envelope is kept filled with pressurized water whose evaporation absorbs the heat of the oxo reaction taking place within the tube 20' so that the temperature within the tube 20' remains constant at a selected level.

The reaction mixture released from the tube 20' passes through a heat exchanger 22 in which it is cooled to ambient temperature, and is then led through a pipe 23 to a high pressure separator 24 from which the gaseous components of the mixture are withdrawn through a line 25. The afore-mentioned circulating pump 10 communicates with the line 25 through a conduit 26. It returns a portion of the gaseous material through a pipe 11 to the high pressure pipe 12. The remainder of the gaseous material is vented to a low pressure circuit, not relevant to this invention, by a pressure reducing valve 27.

The liquid stripped of gases in the separator 24 is discharged through a valve 28 to a conduit 29 at a pressure reduced to 0 to 10 atmospheres gauge. Gases released from the liquid at the lower pressure are removed in a low pressure separator 30, and are returned through a valve 31 and a conduit 32 to the gas holder 6. The stripped liquid is discharged from the separator 30 through a valve 33 and a conduit 34 to a purification and catalyst recovery plant, not itself relevant to this invention, in which a cobalt bearing material is recovered from the cobalt carbonyl content of the liquid, and the aldehyde formed is isolated.

Specific arrangements of first reactor vessels which favor back-mixing of the cobalt carbonyl with the cobalt bearing material and gas mixture fed to the vessel 5 are illustrated in FIGS. 2 to 4.

The closed cylindrical vessel 5 common to the several arrangements received solvent and the cobalt bearing catalyst raw material through the conduit 4 which leads to the bottom end of the vessel. The gaseous reactants are received through the high pressure pipe 12 which terminates in a nozzle 35 closely adjacent the vessel bottom. The reaction product is withdrawn at the top through the line 13. The external heating jacket of the vessel 5 and the valved tubular connection which permits an initial amount of cobalt carbonyl to be introduced into the vessel 5 have been omitted for the sake of clarity.

In the arrangement shown in FIG. 2, adequate backmixing is obtained by the turbulence produced in the relatively wide vessel by the gas mixture. In the embodiment illustrated in FIG. 3, a shorter and narrower cylindrical tube 36 is coaxially mounted within the vessel 5. The first reaction zone within the vessel is thus divided into a central portion 37 and an outer portion 38 of annular cross section. The two portions of the reaction zone communicate with each other at the top and bottom of the vessel.

Three axially spaced perforated plates 39 in the central portion 37 of the first reaction zone produce a flow pattern in which a portion of the reacted material is returned to the bottom of the vessel 5 through the partly obstructed central portion 37 of the reaction zone.

Recycling of the reaction product to the feed end of the vessel 5 is accomplished in the embodiment illustrated in FIG. 4 by an external recycling conduit 40 equipped with a valve 41, and connecting the line 13 to the high pressure pipe 12.

The devices shown in FIGS. 3 and 4 are preferably operated at a recycling ratio of 5 to 50 percent.

The following examples are further illustrative of the operation of the afore-described apparatus.

*Example 3*

A dispersion of cobalt hydroxide in methanol having a cobalt content of 2.4 g./l., and a gaseous mixture of carbon monoxide and hydrogen in a ratio of 1:2 containing 0.4 vol. percent of oxygen were introduced at respective rates of 2 liters per hour and of 1.8 m.$^3$/hr., into the jacketted reaction vessel described in Example 1. It initially contained 0.3 l. of a methanol solution of cobalt carbonyl containing 2.4 g./l. cobalt. The dispersion and the gas mixture were introduced into the first reaction zone at a pressure of 200 atm. from an inlet at the bottom of the conversion vessel and were heated to 135° C. by oil at 145 C. circulated through the jacket.

A light yellowish transparent solution of cobalt carbonyl and a gas mixture containing less than 0.001 vol. percent of oxygen were discharged from an outlet at the top of the vessel. The discharged material was passed through a conduit and a bottom inlet into a cylindrical high pressure mixing tank, 15 cm. high and 8 cm. in diameter, and having a capacity of 0.6 l. At the same time, a methanol solution of 320 g./l. acrylonitrile was introduced at a rate of 2 liters per hour from an inlet at the bottom into the high pressure mixing tank and was homogeneously mixed with the cobalt carbonyl solution.

The resulting mixed solution and the gas were fed from an outlet at the top of the high pressure mixing tank through a conduit to one end of an oxo-reactor which was a tube of 6 mm. diameter and 120 m. length. The reactor tube was bent into 20 turns of 6 m. length each, and was enclosed in an enveloping vessel. Superheated steam at 130° C. was circulated between the tube and the vessel. The time required for joint passage of the liquid mixture and of the gas through the reactor was approximately 20 minutes.

The reaction mixture discharged was immediately cooled to room temperature, and the gaseous portion was separated from the liquid. The yield of β-cyanopropionaldehyde and of its dimethylacetal recovered from the reaction product in a continuous run of 10 hours was 86% of the theoretical value.

*Example 4*

A dispersion of about one part by weight cobalt hydroxide in 99 parts isopropanol, and a gas mixture containing carbon hydroxide and hydrogen in a volume ratio of 1:1, and contaminated with 0.1 percent oxygen were introduced jointly into a reaction vessel at respective hourly rates of 200 liters and 120 cubic meters (as converted to standard conditions of temperature and pressure).

The reaction vessel was of the type illustrated in FIG. 3. The inside diameter of the outer vessel 5 was 200 millimeters, its height 3.5 meters, and the diameter of the inner cylindrical tube 36 was 120 millimeters. The vessel was provided initially with 30 liters of a 1% cobalt carbonyl solution in isopropanol. A temperature of 110° C. and a pressure of 300 atmospheres were maintained during the conversion reaction.

The material withdrawn from the top of the first reaction vessel 5 consisted of a cobalt carbonyl solution free from cobalt hydroxide, and of a gas mixture containing less than 0.001 percent oxygen by volume. This material was mixed in continuous stream in a high pressure mixing tank with a solution of 392 parts by weight isopropanol and 138 parts acrylonitrile supplied at the rate of 530 kilograms per hour.

The mixed material was fed to a second reaction vessel 25 millimeters in diameter and 900 meters long. The oxo reaction was performed in the tubular vessel at 130° C. and 300 atmospheres. The average dwell time of the mixture in the tube was approximately 25 minutes.

The reaction mixture was worked up in a conventional manner as described in Example 3. The overall yield of beta-cyanopropionaldehyde in a ten hour run was 82 percent based on the acrylonitrile used.

*Example 5*

The process described in Example 3 was repeated, but a first reaction vessel of the type shown in FIG. 4 was used for the transformation of cobalt hydroxide to cobalt carbonyl. The liquid in the first reaction vessel was recycled at a rate of 10 percent through the external recycling conduit. Under otherwise similar conditions, the reaction temperature was lowered 25° C. by the recycling to 110° C. A yield of 86% β-cyanopropionaldehyde was obtained as in Example 3.

*Example 6*

The apparatus employed in Example 5 was used for the synthesis of methyl β-formyl propionate. Cobalt acetate dissolved in acetone (2 grams cobalt per liter) was fed to the first reaction vessel for reaction with carbon monoxide and hydrogen, whereby cobalt carbonyl was formed, and oxygen was removed from the raw gas mixture. A 250 gram per liter solution of methyl acrylate in acetone was fed to the second reaction zone. The yield of methyl β-formyl propionate was 80% on the basis of the original acrylate.

Similar results were obtained with the use of methanol as a solvent, and with ethyl acrylate as the olefinic compound.

While the invention has been described with reference to specific embodiments, it will be understood that it is not limited thereto, but is to be construed broadly, and is defined by the appended claims.

What we claim is:

1. In a method of converting an olefinic starting material to an aldehyde by oxo reacton with carbon monoxide and hydrogen, the reaction being performed during continuous flow of the reactants through a long and narrow tubular vessel at a temperature of approximately 110° to 140° C., at a pressure of approximately 50 to 300 atmospheres, and in the presence of cobalt carbonyl, the source of said carbon monoxide and hydrogen being a gas mixture contaminated with at least 0.02% by volume elementary oxygen as an impurity, the remainder of said mixture essentially consisting of said carbon monoxide and said hydrogen, the improvement in the purification of said gas mixture and the formation of said cobalt carbonyl which comprises:

(a) continuously feeding said gas mixture and a cobalt-bearing material to a reaction zone containing an initial amount of cobalt carbonyl;

(b) maintaining the temperature of said zone at not less than 100° C. but substantially below 150° C. and the pressure of said zone at 50 to 300 atmospheres, said cobalt bearing material being different from cobalt carbonyl and capable of being converted to additional cobalt carbonyl by carbon monoxide at said temperature and pressure in the presence of said initial amount of cobalt carbonyl;

(c) mixing the contents of said zone so that said additional cobalt carbonyl is continuously formed and is contacted with cobalt-bearing material being fed to said zone, and the gas mixture fed to the zone is purified when the contaminating oxygen is consumed by reaction with said additional cobalt carbonyl; and (d) continuously withdrawing from said reaction zone and transferring to said tubular vessel cobalt carbonyl and purified gas mixture for reaction in said vessel with said olefinic starting material.

2. In a method as set forth in claim 1, a portion of said cobalt-bearing material being transferred from said reaction zone to said vessel with said cobalt carbonyl and said purified gas mixture.

3. In a method as set forth in claim 1, said cobalt-bearing material being cobalt metal in finely divided form, cobalt oxide, cobalt hydroxide, cobalt carbonate, cobalt formate, cobalt acetate, cobalt stearate, cobalt oleate, cobalt palmitate, cobalt naphthenate, or an organic complex salt of cobalt, and said cobalt-bearing material being fed to said reaction zone while dispersed in a liquid solvent inert to said carbon monoxide, said hydrogen, said cobalt carbonyl, said cobalt-bearing material, and said olefinic starting material, said solvent being an alcohol, a ketone, an ether, or an ester.

4. A method as set forth in claim 1, wherein said temperature of said reaction zone is between 105° and 120° C.

5. A method as set forth in claim 1, wherein said temperature of said reactants in said vessel is between 125° and 135° C.

6. A method as set forth in claim 1, wherein said cobalt bearing material is cobalt hydroxide.

7. A method as set forth in claim 1, wherein said olefinic starting material is acrylonitrile or a lower alkyl acrylate.

8. A method as set forth in claim 1, wherein said cobalt bearing material is fed to said reaction zone while dispersed in a liquid solvent inert to said carbon monoxide, said hydrozen, said cobalt carbonyl and said cobalt bearing material at said temperature and said pressure.

9. A method as set forth in claim 8, wherein said solvent is a lower alkanol.

10. A method as set forth in claim 8, wherein said solvent is acetone.

11. A method as set forth in claim 9, wherein said lower alkanol is methanol.

References Cited
UNITED STATES PATENTS

| | | | |
|---|---|---|---|
| 2,477,553 | 7/1949 | McKeever | 23—203 |
| 2,477,554 | 7/1949 | McKeever | 23—203 |
| 2,500,256 | 3/1950 | Mahan | 260—465.1 |
| 2,848,304 | 8/1958 | Yoshida et al. | 260—483 X |
| 2,865,716 | 12/1958 | Hasek | 23—203 |
| 2,887,507 | 5/1959 | Dazzi | 260—483 |
| 2,985,504 | 5/1961 | Orchin | 23—203 XR |
| 3,010,994 | 11/1961 | Iwanaga et al. | 260—465.1 X |

CHARLES B. PARKER, *Primary Examiner.*

JOSEPH P. BRUST, *Examiner.*